United States Patent [19]

Candy

[11] Patent Number: 4,942,360
[45] Date of Patent: Jul. 17, 1990

[54] A METHOD AND APPARATUS OF DISCRIMINATION DETECTION USING MULTIPLE FREQUENCIES TO DETERMINE A RECOGNIZABLE PROFILE OF AN UNDESIRABLE SUBSTANCE

[76] Inventor: Bruce H. Candy, Hunters Road, Basket Range, Australia, 5138

[21] Appl. No.: 93,837

[22] Filed: Sep. 8, 1987

[30] Foreign Application Priority Data

Sep. 8, 1986 [AU] Australia .................. PH7889

[51] Int. Cl.⁵ .................................. G01V 3/10
[52] U.S. Cl. ............................. 324/329; 324/335
[58] Field of Search ............. 324/326, 330, 327, 335, 324/328, 329, 239, 233, 260, 236, 238, 344, 336, 337

[56] References Cited

U.S. PATENT DOCUMENTS

| | | | |
|---|---|---|---|
| 4,061,968 | 12/1977 | Pigeon | 324/234 |
| 4,128,803 | 12/1978 | Payne | 324/239 X |
| 4,230,987 | 10/1980 | Mordwinkin | 324/233 X |
| 4,249,128 | 2/1981 | Karbowski | 324/329 |
| 4,263,551 | 4/1981 | Gregory et al. | 324/235 |
| 4,303,879 | 12/1981 | Podhrasky | 324/329 |
| 4,325,027 | 4/1982 | Dykstra et al. | 324/329 |
| 4,334,191 | 6/1982 | Podhrasky | 324/329 |
| 4,334,192 | 6/1982 | Podhrasky | 324/329 |
| 4,486,713 | 12/1984 | Gifford | 324/239 X |
| 4,628,265 | 12/1986 | Johnson et al. | 324/329 |

FOREIGN PATENT DOCUMENTS 2004069 3/1979 United Kingdom ............... 324/335

Primary Examiner—Reinhard J. Eisenzopf
Assistant Examiner—Warren S. Edmonds
Attorney, Agent, or Firm—Cushman, Darby & Cushman

[57] ABSTRACT

A conducting metal discriminating detection apparatus which uses at least two different frequencies and in preference 3 to interrogate a target. The detection apparatus distinguishes reactive and resistant components of each of the received signals and combines these in such a way as to avoid effects of background such as ironstone in one case or salt water in another.

18 Claims, 5 Drawing Sheets

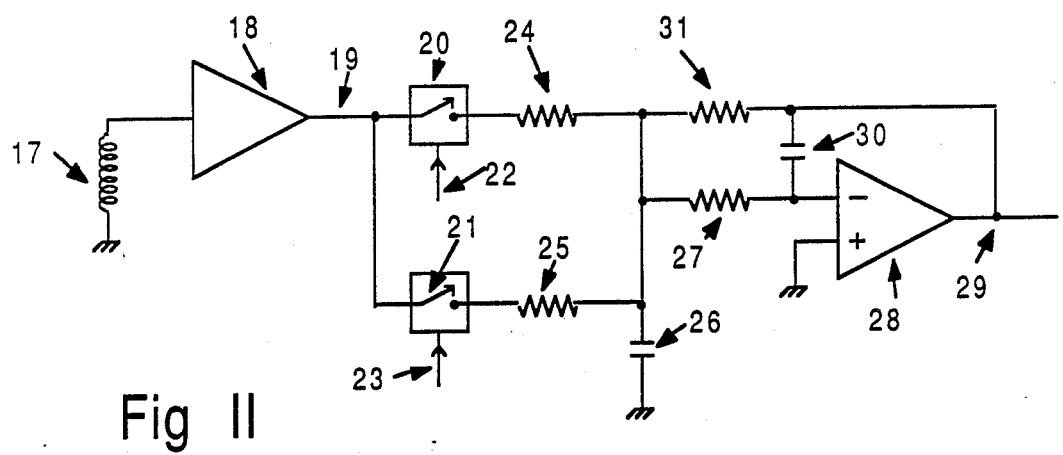
Fig II

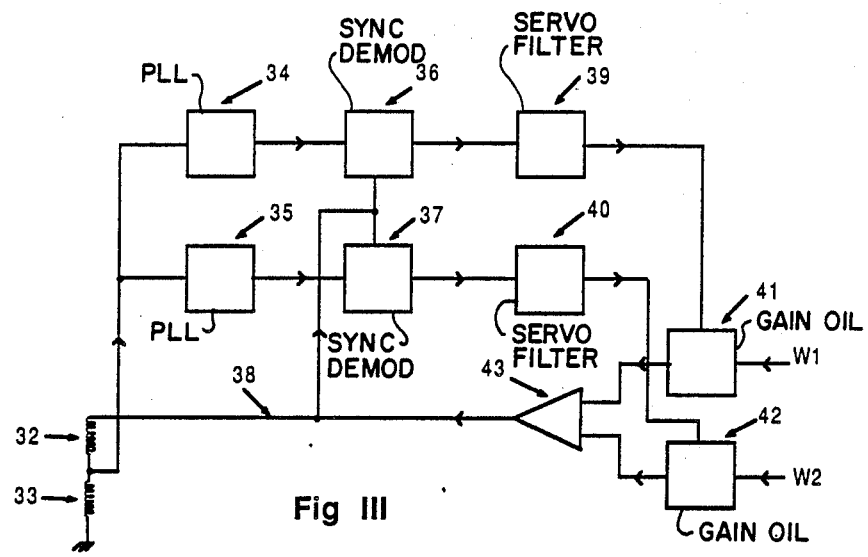
Fig III

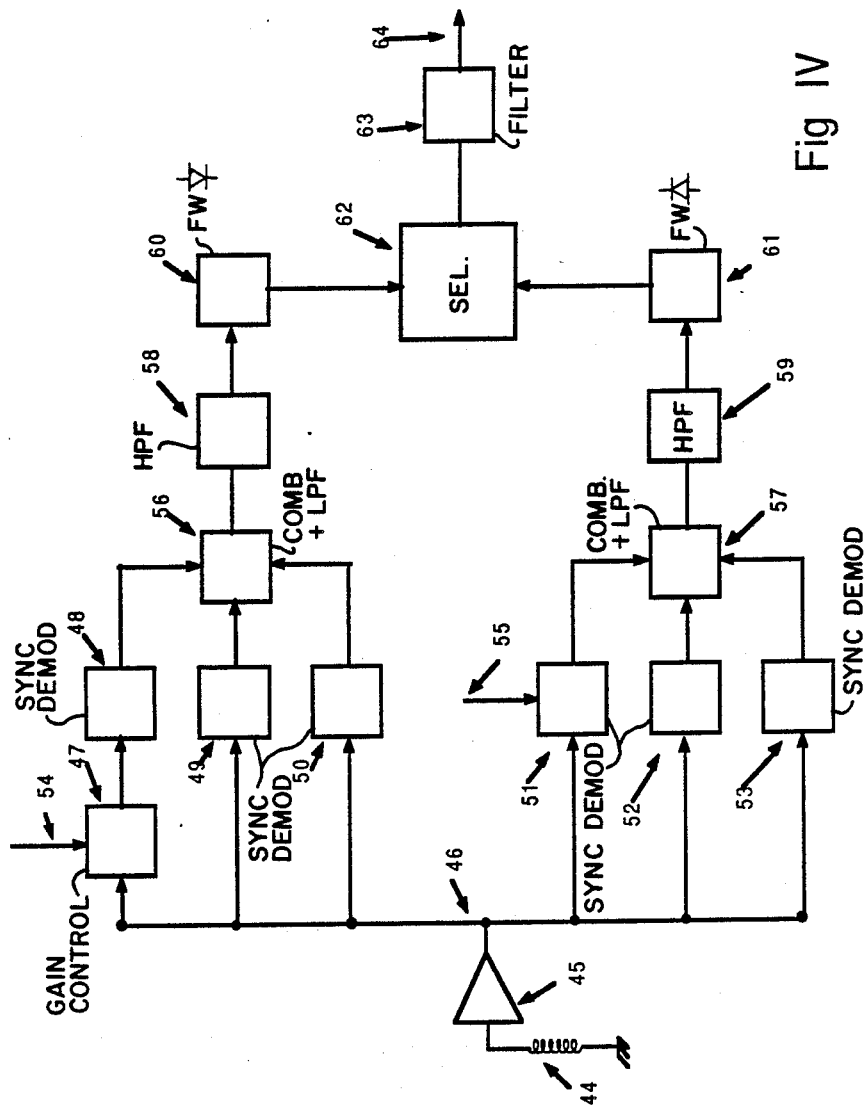

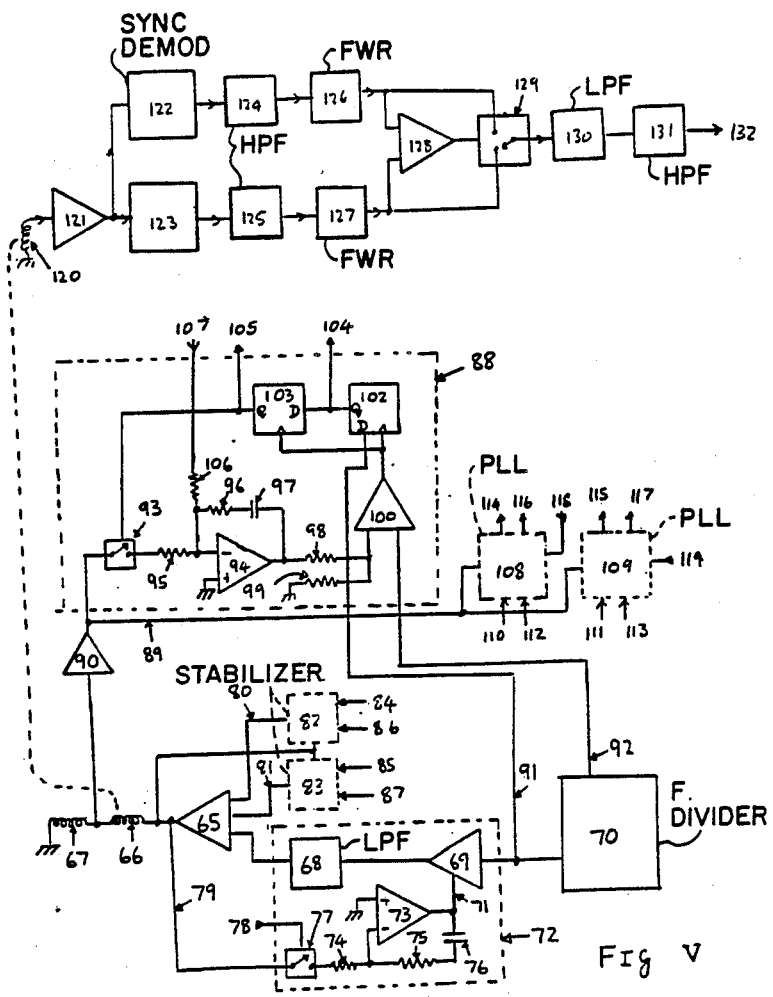
Fig V

A METHOD AND APPARATUS OF DISCRIMINATION DETECTION USING MULTIPLE FREQUENCIES TO DETERMINE A RECOGNIZABLE PROFILE OF AN UNDESIRABLE SUBSTANCE

This invention relates to conducting metal discriminating detectors.

The problem to which this invention is directed relates to difficulties associated with discriminatory detection of target objects when within an environment that provides either substantive reactive or resistive components of re-transmitted signals such that it has been hitherto difficult to distinguish a target signal from a background signal.

Such an environment can be typically ironstone or salt water or indeed both.

The object of this invention is to achieve a method and apparatus by which greater sensitivity can be achieved in such difficult environments.

CONCEPT OF THE INVENTION

According to this invention there is provided a conducting metal discriminating detection apparatus comprising means to transmit at least two alternating magnetic fields of different frequency each below 100 kHz, means to receive respective retransmitted signals arising from each of the transmitted frequencies from a target, wherein there are means whereby the respective received signals will be demodulated for assessment of reactive and/or resistive component magnitude which respective levels will then be compared such that an output signal can be available, an interpretable characteristic of which is substantially independent of a background environment where this includes substantial material which has a substantial magnetic effect and has a reactive to resistive response ratio which is substantially independent of any interrogating frequency below 100 kHz.

In preference, the detected signals are compared such that a predominantly reactive component from each received signal is subtracted one from the other.

In preference, three different frequencies are used and such three frequencies are simultaneously transmitted and the detected re-transmission from the target environment is separately detected and treated so that an at least predominantly reactive component of such signals in the one case, or at least a predominantly resistive component of the signals in the other, are separately handled so that by use of comparison of the responses, greater sensitivity can be achieved.

In preference, if ironstone is the background environment, it is found that if the reactive synchronously demodulated received signals of different retransmitted signals are subtracted one from the other, then the result is such that the influence of ironstone is substantially reduced and in many cases effectively nulled entirely.

According to a further form of this invention, it can reside in a method of effecting discriminating detection of a conducting metal target which comprises the steps of interrogating the target with at least two discrete frequencies, detecting any resultant generated magnetic field in respect of each of said discrete frequencies, distinguishing reactive and resistive components of such detected received signals in respect of each of the said discrete frequencies and then combining the results in predetermined manner whereby the said output is substantially independent of selected background materials in the target environment.

In preference, the method is extended to the use of three discrete frequencies.

A background environment of concern comprises ferrites, and particularly iron ferrites.

A further background environment of concern relates to salt water.

In preference, the method when effecting reduction of effect from background ferrite, includes the steps of subtracting the respective incoming signal which comprises dominantly the reactive component from each of the discrete frequencies.

In preference, when the background to be avoided is salt water, the output is based upon predominantly the resistive components of at least three discrete frequencies, and when the sum of the detected signals in the resistive component are equated to zero.

It is understood throughout this specification that such an output can then be used in combination with other detection techniques and discriminating techniques to further assist in detection of materials.

In preference, the discrete frequencies used lie within the range of 500 Hz to 100 kilohertz.

An alternating magnetic field metal detector consists of electronic circuitry in which an alternating current signal is produced which is fed to a transmitting coil, and detection electronics which compares an emf signal induced in a receiver coil to the transmitted signal. The induced signal in the receiver coil results from two sources, namely, from alternating currents flowing in the transmitting coil, and from retransmitting magnetic sources in the local environment under the influence of the transmitted magnetic field.

Consider for the sake of clarity, an ideal situation where the capacitance between windings of both the transmitting coil and receiving coil can be considered negligible.

Also consider that the load presented to the receiving coil by the detection electronics is effectively infinite. Furthermore consider that induced eddy currents in the transmitter or receiver coil may be considered for the following analysis to be negligible. Thus for the analysis which follows, the received signal may be considered as the induced emf resulting from alternating magnetic flux with an amplitude directly proportional to the rate of change of flux passing through the receiver coil.

Under these circumstances, the component of the received signal resulting from currents flowing in the transmitting coil is such that for each Fourier component transmitted, the induced emf in the receiver coil has a phase angle of 90 degrees relative to the component's current flowing in the transmitter coil. This induced component will be called the "magnetic" or "reactive" component.

Any induced received Fourier component with the same phase as the transmitted current, will be called the "loss" or "resistive" component. Received signals resulting from local retransmitting environmental sources induce both resistive and reactive components in the receiving coil. Two sources dominate in most ground. One results from ironstone in which the reactive component is usually much greater than the resistive component (usually by more than 100 times), and the second results from mildly electrically conductive components such as moist ground containing salts.

The most difficult ground for detecting highly conductive metal targets, such as coins, gold, underwater pipes etc., is that containing large concentrations of ironstone whose resistive to reactive ration varies spatially, and worse still if the ground also contains moderately electrically conductive components. Usually the reactive to resistive component ratios in most ground is of the order of 100. The best of the existing metal detectors transmit a roughly sinusoidal signal (distortion< −20 dB) at between a few kHz to a few 10's of kHz. The received signal is synchronously demodulated and passed through a low-pass filter to remove both noise and carrier related signals.

The phase angle of the demodulator is set so that the detector is insensitive to components with a phase near to the reactive component, but offset by usually less than several degrees towards the resistive component. This phase angle can be varied, and is so in most detectors manually by means of the user varying a potentiometer. The user is said to "ground balance" the detector to a local area of ground, so that the detector is relatively insensitve to the local area. This occurs when the detector's demodulator "object" channel reference phase is at quadrature to the resultant ground vector of the local reactive and resistive vectors. The "resultant ground vector" varies spatially owing to both variations in the mildly conductive component as well as variations in ironstone resistive component relative to its reactive component. This adjustment need be made frequently for best results.

This invention describes means of reducing these interfering signals intrinsic to the ground from both the sources described above; viz: the mildly conducting material in the ground and varying reactive to resistive component ratios in ironstone by using two or more simultaneous interrogation frequencies while still maintaining sensitivity to highly electrically conducting metal targets.

Furthermore, a detector using three or more simultaneous interrogation frequencies, using the technology described herein to reduce ground signals, can be employed to advantage over existing art to furnish information about the conductive nature of the interrogated metal target object.

To assist with an understanding of the present invention, definitions and back ground mathematics will be presented;

"Resistive channel outputs" refer to the outputs of low-passed synchronous demodulator outputs which have reference phases set to substantially pass reactive component information (but not resistive component information).

"Reactive channel outputs" refer to the outputs of low-passed synchronous demodulator outputs which have reference phases set to substantially pass reactive component information (but not resistive component information).

"Channel gain" refers to the magnitude of the response from the output of the low-passed synchronous demodulator signal arising from one of it's associated interrogation frequencies, resulting purely from the interrogation of an object which is purely reactive at frequencies of the order of the interrogation frequencies and has a response independent of frequencies at these frequencies, with the synchronous demodulator reference phase adjusted so that the low-pass filtered output is substantially sensitive to reactive components (and substantially insensitive to resistive components), all else being equal.

"First order objects" refers to objects that can be represented magnetically as a single inductor L loaded with a single resistor R. For these objects the characteristic frequency Wo is defined as R/L.

In the analysis which follows, for the sake of simplicity, it is assumed that the transmitter and receiver coils are substantially nulled, the systems are linear, and that the low-pass filters are temporally matched. Further, it is assumed that each low-pass demodulator signal is sensitive only to the selected interrogation frequency and not others simultaneously transmitted.

The interrogation of a first order object results in resistive channel outputs LCi being proportional to $$LCi \propto Gi_L WoWi/(Wo^2+Wi^2) \qquad (1),$$

and the reactive channel outputs MCi being proportional to $$MCi \propto Gi_M Wi^2/(Wo^2+Wi^2) \qquad (2),$$

where the Wi are the interrogation frequencies and Gi are the associated channel gains. The subscript refers to the resistive or loss(L) and magnetic(M) responses, and i is a label refering to the ith transmitted frequency.

Most ferrites have frequency independent resistive components at frequencies of the order of typical interrogation frequencies, that is the loss per cycle per interrogation field strength is substantially frequency independent below a certain frequency, usually approximately 100 kHz.

For most such materials, the reactive component is much larger than the resistive component, and is substantially frequency independent below the said frequency. Thus materials for which the loss per cycle per interrogation field strength is substantially frequency independent, also have the property that the reactive to resistive component ratio is frequency independent. For materials with this property, we have calculated and confirmed by measurement that the difference between to reactive channel outputs of equal channel gain, called the reactive difference channel RDi is proportional to $$RDi \propto \log(Wh/Wl) \qquad (3),$$

where Wh is the higher frequency and Wl the lower. Furthermore for materials with this property, we have calculated and confirmed by measurement that for channels of equal gains the ratio of the resistive channel output LCi to reactive difference RDi is proportional to $$LCi/RDi \propto \pi/(2\log(Wh/Wl)) \qquad (4)$$

where the logarithm is natural.

We have noted that non-electrically conducting ground has reactive to resistive component ratios that are frequency independent to within several percentum. That is the predominant ground signals behave like most ferrites, and indeed the major magnetic soil contributer is a ferrite, namely Fe304. Thus it is possible to combine channel outputs in many ways to yield outputs relatively insensitive to non-electrically conducting ground. This can be achieved by directly subtracting resistive channels of equal gain such that the output LDi equals $$LD=LC2-LC1 \qquad (5),$$

or by subtracting reactive difference channels RD1 and RD2, such that the output RDDi is proportional to $$RDD \propto RD1*\log(W4/W3) - RD2*\log(W2/W1), \quad (6)$$

where the channel RD1 is sensitive to MC2−MC1 and RD2 is sensitive to MC4−MC3. (Note W3 may equal W2.) Furthermore this can also be achieved by subtracting a reactive channel from an reactive difference channel, such that the output LRDi is proportional to $$LDi \propto \log(W2/W1)*LC - RD1*\pi/2 \quad (7)$$

Note that most electrically conductive metal objects yield non-zero responses in equations (5), (6) and (7).

Nulls in the Wo domain occur in all the responses defined in equations (5), (6) and (7). However it should be noted that the nulls do not occur at the same frequencies.

BRIEF DESCRIPTION OF THE DRAWINGS

To assist with the understanding of the present invention, reference will now be made to the accompanying illustrations.
wherein
FIGS. I and II show an electronic block diagram of a "reactive difference channel" according to a preferred embodiment, FIG. III shows a block diagram of a transmitting coil reactive voltage stabilizer according to the preferred embodiment and, FIG. IV is a functional block diagram according to the same preferred embodiment showing the receiver layout.

FIG. V shows an example in greater detail of an embodiment of a quasischematic diagram of a detector which transmitts simultaneously three substantially sinusoidal signals of frequency W1, W2 and W3 respectively.

DETAILED DESCRIPTION OF THE DRAWINGS

Figure 1:
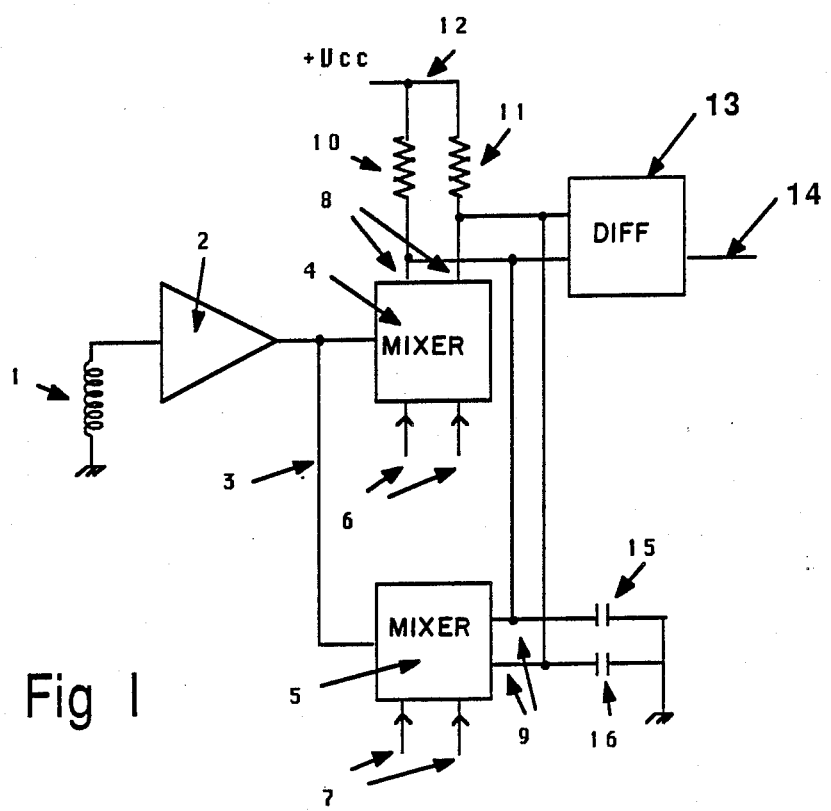

Referring to the drawings in detail it is now noted as follows.

Essentially the "reactive" synchronously demodulated received signals of different transmitted sinusoidal signals are subtracted at the demodulator/low-pass filter interface as shown in FIG. (I) and (II).

The received signal induced in the receive coil 1 is amplified by preamplifier 2 and then passed to the analogue inputs of two low distortion double-balanced mixers with current source outputs 4 and 5. To these demodulators is applied reference signals 6 and 7 respectively each phase-locked to a different transmitted signal, such that the phase of the references are each in-phase (or out of phase) with the reactive components at the preamplifier output.

The mixers' current outputs 8 and 9 respectively are added in the sense that the reactive components from the two frequencies are substracted. The current from the outputs are fed to the supply 12 via two equal valued resistors 10 and 11. The difference between the potential at the outputs of the mixers is measured by a difference amplifier 13 to produce an output 14.

Low-pass filtering is achieved by capacitors 15 and 16 connected between the mixer outputs and ground. In FIG. II, the received signal induced in the receive coil 17 is amplified by preamplifier 18 and then passed to the analogue inputs of two solid-state switches 20 and 21.

Digital reference signals 22 and 23 each phase-locked to a different transmitted signal are applied to the switch controls such that the phase of the references are in-phase (or out of phase) with the reactive components at the preamplifier output.

The outputs of the switches are each fed via a resistor, 24 and 25 respectively to a capacitor 26 connected to ground. A standard "multiple feed back" low-pass filter, comprising of the operational amplifier 28, resistors 27, 31 and the effective input load of 24 and 25 in series with the switches, and capacitors 26 and 30, passes a demodulated and low-passed signal to the output 29.

The digital reference phases are selected in the sense that the reactive components from the two frequencies are subtracted. "Four quadrant" dual synchronous demodulators using solid state switches can be similarly implemented by summing the outputs of two pairs of switches, each pair having one switch with both the reference and analogue inputs out-of-phase relative to the other.

Subtraction at the demodulator stage is substantially more satisfactory than subtracting the low-passed demodulated components as this latter technology requires extremely well temporally matched low-pass filters.

Similarly, the resistive components can be subtracted at the demodulator stage before low-passing this difference. Yet further, the subtractions of equation (7) can be made at the demodulator stage with the appropriate gains selected by the choice of channel gains and resistors.

The simplest means of realising equation (7) with two frequencies is to subtract the outputs of two synchronous demodulators, the reference signal of one is phase locked to one of the transmitted frequencies with the phase selected such that the demodulator substantially passes reactive components, while the reference signal to the other is phase locked to the other transmitted frequency with the phase selected such that the demodulator passes a linear combination of reactive and resistive components, such that the said linear combination and channel gains are selected so that equation (7) is satisfied. The principles of subtraction at the demodulator/low-pass filter interface can be applied to the selection of a linear combination of many synchronous demodulator outputs combined together at this said interface.

The outputs have to be combined in a way such that the output has no nulls in the Wo domain. This can be achieved by full-wave rectification of RDD, LC and/or LDR outputs followed by an adder which adds each rectified output, or a selector which passes the largest instantaneous rectified output. This final output then may be further low- and high- pass filtered. The final output can be used two control an audio output or trigger yet further electronics if a threshold is exceeded.

The above principles cope well with most soils not containing significant electrically conductive components. Most soils, even if substantially wet fall in this category. Wet brackish soils do not, and means to cope with these are now given:

Mildly electrically conducting soils, not containing "magnetic soils" such as ironstone can be represented by a continuum of first order objects where the distribution of Wo on scale sizes of the order of 10 cm is only significant at high frequencies, typically much higher than typical metal detector frequencies (2 to 20 kHz).

To a first order approximation objects with Wo, at these frequencies yields an approximate response in equation (1) of $$LCi \approx Gi_L Wi/Wo \quad (8),$$

and equation (2) is approximately zero. Thus any reactive channel essentially contains little information arising from mildly electrically conductive components (on the scale size of the order of 10 cm), and resistive channels respond to the salt component in proportion to the channels associated interrogation frequency to a first order approximation. Thus in order for any resistive component associated output to be insensitive to mildly conducting ground components, a further constraint must be made so that for interrogation frequencies Wi, the mildly conductive insensitive output LD is proportional to, $$LDD \propto \sum_i Gi_L LCi, \quad (9)$$

where $$\sum_i GiLWi = 0. \quad (10)$$

For soils containing ironstone and salt water, signal differences in reactive difference channels satisfying (6) will suffice, as do signal differences in resistive difference channels satisfying (9), (10) and $$\sum_i GiL = 0. \quad (11)$$

For example a system with 3 frequencies realising these equations such that no nulls occur in the frequency response could consist of a resistive or loss difference differencer (LDD output) and a reactive difference differencer (RDD output). For this system, LDD is proportional to $$LDD \propto G1_L - G2_L + G3_L \quad (12),$$

where
$$G2 = G1(W3-W1)/(W3-W2) \quad (13)$$
and
$$G3 = G2 - G1 \quad (14).$$

The above equations indicate that the equal channel gain reactive difference outputs (RD) have advantages over the current art single frequency resistive channel output (LC) detectors with interrogation frequency near to the geometric mean of the frequencies of the two reactively compared components, for the detection of objects with predominant characteristic frequencies near to and within the frequency span defined by the two interrogation frequencies: For less than 16:1 frequency ratio, the ratio of object signals to signals arising from magnetic soils in RD are greater than those in LC. More importantly, RD is relatively insensitive to mildly electrically conducting ground components unlike LC. In addition, the measurement of RD rather than LC has advantage for metal detectors in which the design aim is to detect objects with predominant Wo within this said frequency span and not outside it (such as "coin detectors"), owing to the fact that RD has this very property unlike LC, as stated in the equations.

As above approximations are not perfect; that is the reactive to resistive ratio of ironstone is not entirely frequency independent (at audio frequencies), for best results small adjustments need to be made to parameters (gains or phase angles), to "ground balance" the detector for interrogation of different soils. These adjustments can be performed manually.

It is important that the reactive transmitting coil voltage does not change significantly owing to changes in the coil's inductance as the coil interrogates different magnetic soils. Such reactive voltage changes will induce spurious signals owing to varying retransmitting background resistive components. Further more in general different frequencies' reactive voltages will be effected differently.

This will cause spurious signals especially in RD signals. In order to overcome this problem the transmitting coils reactive signal voltages at each frequency should be measured and the level should be stabilised by a servo loop.

As an example a means of realising this for two simultaneously transmitted signals of frequency W1 and W2, is given in FIG. (III). The transmitter coil 32 is connected in series with an inductor 33 across which the reference transmitted current is measured. (This may in fact be any load, example resistor or capacitor.)

The voltage across 33 is fed to two phase-locked loops 34 and 35. 34 is locked to W1 and 35 to W2. The digital outputs of these are fed to two synchronous demodulators 36 and 37 respectively. To both the analogue inputs of 36 and 37 are fed a voltage 38 which appears across 32 and 33. The output phases of 34 and 35 are selected so that the synchronous demodulators are sensitive to the transmitter coil's reactive voltage and substantially not it's resistive voltage at the respective frequencies. The outputs of 36 and 37 are passed to the servo-loop filters 39 and 40 respectively. The outputs of 39 and 40 are used to control the level of the input signals (at frequencies W1 and W2 respectively) by gain controlled stages 41 and 42 respectively. The outputs of 41 and 42 are feed to a summing amplifiers 43 which is connected to the transmitter coil, at which node the combined signal 38 appears.

As an example of all of the above concepts, bar the reactive transmitted signal level controls, FIG. (IV) shows a block diagram of a detector in which 3 simultaneous magnetic interrogation signals are transmitted of different frequencies W1, W2 and W3, where W3>W2>W1.

The received emf in the receiver coil 44 is amplified by a preamplifier 45, the output 46 of which is feed to the analogue inputs of synchronous demodulators 48 via a gain controlled stage 47, and synchronous demodulators 49, 50, 51, 52, and 53. The amplification factor of 47 is determined by a control level 54.

The reference digital inputs to the demodulators 48, 49 and 50 are the three different frequencies substantially reactive references, where the reference phase of W2 is in the opposite sense the other two, as per equation (6) with W3=W2 in this said equation. Demodulators 51, 52 and 53 have substantially resistive digital references at the three different frequencies. The sense of the reference of W2 is opposite to that of the other two. The digital reference of 51 is phase shifted by small angles for ground balancing purposes.

The demodulator outputs are combined by means described above, by means of the combiners and low-pass filters 56 and 57. The outputs of 56 and 57 are passed to high-pass filters 58 and 59 respectively. The outputs of 58 and 59 are passed to full-wave rectifiers 60 and 61 respectively. The highest instantaneous output of the outputs of 60 and 61 is selected by a selector 62 and passed to the output 64 which may be first low- and high-pass filtered by a filter 63.

The channel gains are selected to substantially obey equations (6), (12), (13) and (14). It must be noted that many additional outputs with the same concepts shown in FIG. IV and manifest in equations (5) to (13) can be obtained using 3 frequencies that are relatively independent of ironstone, or mildly electrically conducting ground components or both.

As an example in greater detail of an embodiment FIG. (V) shows a quasischematic diagram of a detector which transmitts simultaneously three substantially sinusoidal signals of frequency W1, W2 and W3 respectively, by means of a summing amplifier 65 applying a composite signal to a transmitting coil 66. The current flowing through this coil flows through a small valued inductor 67 for sensing the said current. The output of a low-pass filter 68 is feed to one of the inputs of 65. The input to 68 is a square-wave of frequency W1, the amplitude of which is controlled by a voltage controlled amplifier 69 to which input is feed the source of W1 from a frequency divider 70. The gain of 69 is controlled by a voltage 71. Signal 71 is controlled by the level of the reactive component across 66 at the frequency W1 by means of a servo loop. The loop filter consists of the operational amplifier 73, an input resistor 74, damping resistor 75, and integrating capacitor 76. A two quadrant synchronous demodulator solid-state switch 77 has it's reference phase 78 locked to the phase of the transmitting coil's current at frequency W1 and selected so that the servo loop substantially keeps the reactive voltage across 66 constant but not the resistive voltage. The input to the solid state switch is the composite voltage 79 from the output of 65. The other two inputs to 65 are from the outputs 80 and 81 of 82 and 83 respectively, which are servo-loop level stablisers and correspond to the building block of the same form as 72 for producing signals at frequencies W2 and W3 respectively. 72 consists of 68,69,71,73,74,75,76 and 77. As in the block 72, 82 and 83 are each fed 79, and to each is fed two digital signals. One of the said digital signals is the source of frequency W3 84 feeding 82 and the source W2 85 feeding 83, and the other is the synchronous demodulator reactive reference phase, 86 feeding 82 and 87 feeding 83. The operation of 82 and 83 is the same as that of 72 (except for the operating frequencies). A phase-locked loop 88 is locked to W1, the input signal 89 being the voltage across 67 amplified by amplifier 90. Also to this phase-locked loop is feed the digital signal input to 72, namely 91. Another digital signal 92 at four times the frequency of W1 and locked to it, is fed to 88 from 70. The composite signal 89 is fed to the synchronous demodulator of 88, the solid-state switch 93. The output 93 is feed to the loop filter consisting of the operational amplifier 94, an input resistors 95, damping resistor 96, and integrating capacitor 97. The output of 94 is attenuated by resistors 98 and 99 and fed to comparitor 100. The other input of 100 is 92. The output of 100, namely 101 is fed to the clock inputs of two D-type flip-flops, 102 and 103. The D input of 102 is connected to 91 and the D-input of 103 is connected to the Q output 104 of 102. The Q output of 103, namely 105, feeds the reference phase of 93. The phase of the loop can be off-set by a voltage 107 which feeds a current to the inverting input of 94 via a resistor 106. The transfered phase of 68 and said comparitor input sense is selected so that when zero volts is applied to 107, the phase-locked loop locks so that 105 is substantially at quadrature with the W1 component in 89. Phase locked loops 108 and 109 are locked to the components of W2 and W3 respectively in 89. 108 and 109 are the same type of building blocks as 88, but with different frequency signal digital inputs. The square-wave source of W2 feeds 108 via 110, while the source of W3 feeds 109 via 111. A phase locked signal of four times W2 feeds 108 via 112 and the corresponding input for 109 is via 113. The flip-flop outputs of 108 and 109 corresponding to 104 and 105 for 88, appear at 114 and 116 respectively for 108, and 115 and 117 respectively for 109. The phase can be off-set in 108 and 109 by the application of a voltage at 118 and 119 respectively, corresponding to the input 107 of 88. The received magnetic signal induces an emf in receiver coil 120, which is amplified by amplifier 121. The output of 121 feeds synchronous demodulators, combiners and low-pass filters 122 and 123, described above. The possible reference inputs to these are numerous, and the channel gains and phases must satisfy the equations described above, depending on application. For example, a general purpose hand-held metal detector that is to be used to interrogate ground containing ironstone and brackish water could have three synchronous demodulators in both 122 and 123, where the outputs of the three in 122 are combined with reactive reference phases selected, and likewise in 123 but with resistive phase references selected. The channel gains in 122 need satisfy equation (6) and in 123 the gains should satisfy equation (12), (13) and (14). In equation (6), $W2 = W3$ and corresponds to W2 in this example, and W4 in equation (6) corresponds to W3 in this example. The outputs of 122 and 123 are fed to high-pass filters 124 and 125 respectively. The outputs of 124 and 125 are fed to full-wave rectifiers 126 and 127 respectively. The outputs of 126 and 127 are compared by comparitor 128, the output of which controls a solid-state switch 129 such that the larger instantaneous output of 126 and 127 is selected to be passed to the low-pass filter 130, the output of which is fed to a high-pass filter 131. The output of 131, namely 132 is the system output which may be fed to a meter or audio controller. For best results W1, W2 and W3 are phase locked. If the transfered phase response of 121 is substantially zero (or one hundred and eighty degrees) at frequencies W1, W2 and W3, then 104 and it's complement are the reactive phase references for W1, and 114 and it's complement, and 115 and it's complement are the reactive reference phases of W2 and W3 respectively. Also 105 and it's complement are the resistive phase references for W1, and 116 and it's complement, and 117 and it's complement are the resistive reference phases of W2 and W3 respectively for this said phase condition of 121.

There is yet another advantage of the processing described herein, namely that discrimination of characteristic frequencies of electrically conducting targets in soil can be determined at a relatively remote distances using the processed signals described herein compared to the current art techniques which simply measure the reactive to resistive ratio. The very large back ground reactive signal due to magnetic soils found in most soils, substantially places a limit on the ability of these sort of single frequency reactive/resistive discriminators. Measurement and analysis of at least three different reduced ground sensitive outputs yield unique information about Wo without large contaminating ground signals.

The frequencies selected for this purpose are 1 kHz, 4 kHz and 16 kHz. In trials conducted these frequencies used in the manner described provided the advantages of the invention.

What is claimed:

1. A conducting metal discriminating detection apparatus comprising:
   means to transmit at least two alternating magnetic fields of different frequency, each below 100 kHz,
   means to receive respective signals arising from each of the transmitted frequencies being retransmitted from a target,
   means for demodulating the respective received signals to determine a presence of at least one of reactive and/or resistive components;
   means for comparing magnitudes of respective component levels at said different frequencies to produce an output signal indicative thereof an interpretable characteristic of which is substantially independent of a background environment which includes substantial material which has a substantial magnetic effect and has a reactive to resistive response ratio which is substantially independent of an interrogating frequency wherein said means for demodulating includes at least one synchronous demodulator for each transmitted signal component, synchronous demodulator references being derived from said transmitted signal components,
   a low pass filter coupled to outputs of the synchronous demodulator, and wherein a low-passed output of each said demodulator is sensitive to one only of the transmitted frequencies, and each said synchronous demodulator having its reference selected whereby each said low-passed synchronously demodulated output includes information proportional to either predominantly reactive components of the magnetically interrogated environment at a frequency Wi, where i is the mathematical label of the i-th transmitted frequency (i=1,2,...), to which the demodulator is sensitive, the output of such a demodulator's low-pass filter being called RCI the output of the reactive channel of Wi, or to predominantly resistive components of the magnetically interrogated environment at the frequency, Wi, to which the demodulator is sensitive, the output of such a demodulator's low-pass filter being called LCi, the output of the resistive channel of Wi, and further comprising
   interpretive means including means adapted to compare by subtraction at least a selected ratio of one of the reactive channel's outputs with another to result in a difference signal called a reactive difference signal RDk, where k is the mathematical label of the Kth reactive difference signal (k=1, ...), such that RDk yields substantially no change when material that is substantially purely reactive and non-resistive below 100 kHz is moved within the influence of the transmitted fields and this occurs when the reactive channel gains are selected to be substantially equal.

2. A conducting metal discriminating detection apparatus comprising:
   means to transmit at least two alternating magnetic fields of different frequency, each below 100 kHz,
   means to receive respective signals arising from each of the transmitted frequencies being retransmitted from a target,
   means for demodulating the respective received signals to determine a presence of at least one of reactive and/or resistive components;
   means for comparing magnitudes of respective component levels at said different frequencies to produce an output signal indicative thereof, an interpretable characteristic of which is substantially independent of a background environment which includes substantial material which has a substantial magnetic effect and has a reactive to resistive response ratio which is substantially independent of an interrogating frequency,
   wherein said means to transmit an alternating magnetic field are adapted to provide three different frequencies, each less than 100 kHz and above 500 Hz, and further including an interpretive means including means adapted to compare by subtraction at least a selected ration of one of the reactive difference signals with another to result in a difference signal RDDm where m is the mathematical label of the mth difference of reactive difference signals (m=1, ...), such that RDDm yields no change when magnetic material with frequency independent reactive to resistive component ratios at frequencies below 100 kHz is moved within the influence of the transmitted fields, so that if RDDm $\alpha$ (the said selected ratio) * RDk-RDn, then d/dt (RDDm)=0 for the interrogation of such said material only and this results when the change gains are selected such that RDDm $\alpha$ RDk*log(W4/W3)-RDn*log(W2/W1) where the log is a natural log, RDk equals the difference in the resistive channels of W1 and W2, and RDn equals the difference in the resistive channels of W3 and W4, where the channel gains are equal, and W2>W1 and W4>W3, and in the case of three simultaneously transmitted signals, W2 may equal W3 or W4, or W3 may equal W1.

3. A conducting metal discriminating detection apparatus comprising:
   means to transmit an alternating magnetic field with at least two different frequencies, being each less that 100 kHz and above 500 Hz,
   at least one synchronous demodulator for receiving and synchronously demodulating each transmitted signal component as retransmitted by reflections from the ground having synchronous demodulator references which are derived from said transmitted signal components,
   low pass filters, one for each synchronous demodulator, wherein a low-passed output of each said demodulator is sensitive to one only of the transmitted frequencies, and each said demodulator having its reference selected whereby each said low-passed synchronously demodulated output will contain information proportional to one of predominantly reactive components of the magnetically interrogated environment at the frequency Wi where i is the mathematical label of the ith transmitted frequency (i=1,2...), to which the demodulator is sensitive, the output of such a demodulator's low pass filter being called RCi the output of the reactive channel of Wi, or b) predominantly resistive components of the magnetically interrogated environment at the frequency Wi, to which the demodulator is sensitive, the output of such a demodulator's low-pass filter being called LCi the output of the resistive channel of Wi,
   an interpretive means including means adapted to compare by subtraction at least a selected ratio of one of the resistive channel's outputs with another to result in a difference signal called a resistive difference signal $LD_k$ where k is the mathematical label of the kth resistive difference signal (k=1,2...), such that $LD_k$ yields substantially no change when magnetic material which has substantial magnetic effect and has a reactive to resistive components response ratio which is substantially independent of any interrogating frequency below 100 kHz is moved within the influence of the transmitted fields and this occurs when the resistive channel gains are selected to be substantially equal.

4. A conducting metal discriminating detection apparatus comprising:

means to transmit an alternating magnetic field with at least three different frequencies, being each less than 100 kHz, and an interpretive means, including means adapted to compare by subtraction at least a selected ratio of one of the resistive difference signals with another to result in a difference signal $LDD_m$ where m is a mathematical label of the mth difference of resistive difference signals (m=1...), such that $LDD_m$ yields substantially no change when either magnetic material which has a substantial magnetic effect and has a reactive to resistive component response ratio which is substantially independent of any interrogating frequency at frequencies below 100 kHz or non-magnetic material that is mildly electrically conductive or both is moved within the influence of the transmitted magnetic fields, so that if $LDD_m \alpha$ (the said selected ratio)*$LD_k$-$LD_n$, then $d/dt(RDD_m)=0$ for the interrogation of such said material types only; which results when the resistive channel gains are selected such that the sum of the channel gains resulting in $LDD_m$ equals zero and the sum of the channel gains, each multiplied by the value of its associated transmitted frequency, equals zero.

5. A conducting metal discriminating detection apparatus comprising means to transmit an alternating magnetic field with at least two different frequencies, being each less than 100 kHz, and being such to cause a retransmitted signal from the ground and/or electrically conducting target metal object, means for synchronously demodulateing said retransmitted signal, including at least one synchronous demodulator for each transmitted signal component, having synchronous demodulator references which are derived from said transmitted signals components, low pass filters, connected to outputs of said synchronous demodulating means, where a low-passed output of each said demodulator is sensitive to one only of the transmitted frequencies, and each said demodulator having its reference selected whereby each said low-passed synchronously demodulated output includes information proportional to either (a) predominantly reactive components of the magnetically interrogated environment at the frequency $W_i$ where i is the mathematical label of the ith transmitted frequency (i=1,2...), to which the demodulator is sensitive, the output of such a demodulator's low-pass filter being called $RC_i$ the output of the reactive channel of $W_i$, or b) predominantly resistive components of the magnetically interrogated environment at the frequency $W_i$, to which the demodulator is sensitive, the output of such a demodulator's low-pass filter being called $LC_i$ the output of the resistive channel of $W_i$, or, c) a linear combination of resistance and reactive components of the magnetically interrogated environment at the frequency $W_i$, to which the demodulator is sensitive, the output of such a demodulator's low-pass filter being called $RLC_i$ the output of the reactive/resistive channel of $W_i$, and an interpretive means including means adapted to produce a signal that is linear combination of, either two different reactive channel outputs and a resistive channel output or a reactive/resistive channel output $RLC_i$ and reactive channel output $RC_j$ where i is different from j, to result in a reactive difference resistive difference signal $LRD_k$, where k is the mathematical label of the kth such signal (k=1,2...), such the $LRD_k$ yields substantially no change when magnetic material which has a substantial magnetic effect and has a reactive to resistive response ratio which is substantially independent of any interrogating frequency below 100 kHz is moved within the influence of the transmitted fields; adapted whereby this results when the channel gains are selected so that $LRD_k \alpha LC_j - \pi/(2\log(W_h/W_i))*RD_k$ equals the difference in the reactive components of $W_h$ and $W_i$, $W_h > W_i$, where the channel gains are equal, which for two transmitted signals is equivalent to substracting a reacttive channel output $RC_i$ from $RLC_j$, such that when $RLC_j$ is mathematically split into a predominantly reactive component, $RC_j$ and a predominantly resistive component $LC_j$, where j=h and i=i, or, j=l and i=h, then for effective gain of $RC_i$ being equal to $RC_j$, the effective gain of $LC_i$ is selected whereby $LRD_k \alpha LC_j-\pi/(2\log(W_h/W_i))*RD_k$ where $RD_k$ equals the difference in the reactive components of $RC_i$ and $RC_j$, $W_h > W_i$. then for the selective gain of $RC_i$ being equal to $RC_j$, the effective gain of $LC_i$ is selected whereby $LRD_k \alpha LCJ-\pi/(2\log(W_h/W_i))*RD_k$ where $RD_k$ equals the difference in the reactive components of $RC_i$ and $RC_j$, $W_h > W_i$.

6. An apparatus as in any one of the preceding apparatus claims 1, 3, 4, or 5 characterised in that the apparatus includes means to process the said interpretive signals to give interpretive signals relating to the nature of the interrogated conductiong metal target objects and thereby enabling discrimination.

7. An apparatus as in any one of claims 1, 2, 4, or 5 further characterised in that the apparatus includes means whereby comparisons for interpretive purposes of the received signal components are effected at the synchronous demodulator stages before the respective signal components are low-pass-filtered.

8. An apparatus as in any one of preceding claims 1, 2, 3, or 5 further comprising means for combining said difference signals are adapted to be combined by further interpretive means whereby the said difference signals are each passed through respective high-pass filters, the outputs of these said high-pass filters being each full-wave rectified through respective full-wave rectifiers, the outputs of these said full-wave rectifiers being each added by an adder to produce a final interpretive output.

9. An apparatus as in any one of preceding claims 1, 3, 4 or 5 further characterised in that it includes means whereby the said difference signals are adapted to be combined by further interpretive means whereby the said difference signals are each passed through respective high-pass filters, the outputs of these said high-pass filters being each full-wave rectified through respective full-wave rectifiers, the outputs of these said full-wave rectifiers being fed to a selector which passes the largest instantaneous said full-wave rectified output to a final interpretive output.

10. A conducting metal discriminating detection apparatus comprising:
   means to transmit at least two alternating magnetic fields of different frequency, each below 100 kHz,
   means to receive respective retransmitted signals arising from each of said transmitted frequencies from a target,
   means to synchronously demodulate, for each frequency, the respective received signals to provide an output of a selected linear combination of both reactive and resistive components, and
   comparison means to compare information, from the synchronously demodulate means for respective frequencies, to produce an output,
   wherein said synchronously demodulate means includes a first synchronous demodulator responding to a first frequency and adjusted to a first setting, and
   a second synchronous demodulator responding to a second frequency and adjusted to a second setting,
   wherein said settings are adjusted to effect a non-changing output when interrogation is effected across a solely ferrite background.

11. A conducting metal discriminating detection apparatus as in claim 10 further characterized in that said output comprises an average of synchronous demodulated contributions formed from both reactive and resistive components from both transmitted frequencies,
   where the gains and phase angles of the said synchronous demodulator component channels forming said comparison output are selected such that,
   (a) the sum of gains of the respective resistive components of each respective channel, added to, the product of pi divided by 2 (2 times arctan (1) in radians) and
   (b) the sum each of the gains of the respective reactive component of each respective channel each multiplied by the natural logarithm of the transmit frequency from which the said reactive component is derived,
   substantially equals zero, and also such that
   the sum of all the gains of the respective reactive components of each respective channel substantially equal zero.

12. A conducting metal discriminating detection apparatus as in claim 11 wherein gains of the respective reactive and resistive components channels are selected such that the condition $$\sum_{i=1}^{n} LC_i - \pi/2 \sum_{j=1}^{m} \log(w_j) RC_j = 0$$

is satisfied where $LC_i$ is the ith contributing resistive channel gain (n in total), $RC_j$ is the jth contributing reactive channel gain (m in total), $\pi$ is pi, log is the natural logarithm, and the summation sums over all contributing channels and $$\sum_{j=1}^{m} LC_j = 0$$

where each said synchronous demodulators may contribute both resistive (gain $LC_j$ and reactive components (gain $Rc_i$), where for the ith channel, the net gain of the contribution from the averaged ith synchronous demodulator is $$\sqrt{LC_i^2 + RC_i^2} .$$

13. A method of effecting discriminating detection of a conducting metal target which comprises the steps of:
   interrogating the target with at least two discrete frequencies,
   detecting any resultant generated magnetic field in respect of each of said discrete frequencies,
   distinguishing reactive and resistive components of such detected received signals in respect of each of the said discrete frequencies and then
   combining the results in a predetermined manner whereby the said output is substantially independent of selected background materials in the target environment,
   further characterized in that at least three discrete frequencies used to interrogate the target and each of the at least three frequencies are detected and combined in predetermined manner whereby the said output is substantially independent of selected background materials in the target environment.

14. A method of effecting discriminating detection of a conducting metal target as in claim 13 further characterized in that the interrogating frequencies are within the range of 500 Hz to 100 kHz.

15. A method of effecting discriminating detection of a conducting metal target which comprises the steps of:
   interrogating the target with at least two discrete frequencies,
   detecting any resultant generated magnetic field in respect of each of said discrete frequencies,
   distinguishing reactive and resistive components of such detected received signals in respect of each of the said discrete frequencies and then
   combining the results in a predetermined manner whereby the said output is substantially independent of selected background materials in the target environment,
   further characterized in that the frequencies are transmitted simultaneously.

16. A method of effecting discriminating detection of a conducting metal target as in claim 15 further characterized in that the interrogating frequencies are within the range of 500 Hz to 100 kHz.

17. A method of effecting discriminating detection of a conducting metal target which comprises the steps of:
   interrogating the target with at least two discrete frequencies,
   detecting any resultant generated magnetic field in respect of each of said discrete frequencies,
   distinguishing reactive and resistive components of such detected received signals in respect of each of the said discreter frequencies and then
   combining the resulters in a predetermined manner whereby the said output is substantially independent of selected background materials in the target environment,
   further characterized in that the manner of combining the signals comprises, in the case of two discrete frequencies, subtracting the magnitude of the one signal from the magnitude of the other.

18. A method of effecting discriminating detection of a conducting metal target as in claim 17 further characterized in that the interrogating frequencies are within the range of 500 Hz to 100 kHz.

* * * * *